United States Patent [19]
Brown et al.

[11] Patent Number: 5,120,491
[45] Date of Patent: Jun. 9, 1992

[54] BIMETALLIC THIMBLE TUBE

[75] Inventors: Steve K. Brown, Lynchburg; Larry D. Dixon, Forest, both of Va.

[73] Assignee: The Babcock & Wilcox Company, New Orleans, La.

[21] Appl. No.: 761,097

[22] Filed: Sep. 17, 1991

Related U.S. Application Data

[63] Continuation of Ser. No. 488,169, Mar. 5, 1990, abandoned.

[51] Int. Cl.⁵ .............................................. G21C 17/00
[52] U.S. Cl. ................................. 376/245; 376/254; 376/291; 376/463; 138/154
[58] Field of Search ............ 376/245, 254, 255, 292, 376/463; 138/111, 114, 148, 154, 157, 178

[56] References Cited

U.S. PATENT DOCUMENTS

| | | | |
|---|---|---|---|
| 3,735,478 | 5/1973 | Porter et al. | 29/477.3 |
| 4,070,241 | 1/1978 | Pennell et al. | 176/87 |
| 4,765,944 | 8/1988 | Heuze et al. | 376/254 |
| 4,990,304 | 2/1991 | Rylatt | 376/434 |

Primary Examiner—Brooks H. Hunt
Assistant Examiner—Chrisman D. Carroll
Attorney, Agent, or Firm—R. J. Edwards; D. Neil LaHaye

[57] ABSTRACT

A thimble tube for use in a guide the in a nuclear reactor. The thimble tube is an elongated hollow tube having one end closed. The portion of the tube that extends into the reactor is formed from a plurality of sections attached to each other to form the tube in an alternating fashion along the width and length of the tube. The sections are formed from materials having different coefficients of thermal expansion. This causes the thimble tube to warp into supporting contact with the interior of the guide tube at normal reactor operating temperature.

2 Claims, 2 Drawing Sheets

BIMETALLIC THIMBLE TUBE

This application is a continuation of application Ser. No. 07/488,169, filed Mar. 5, 1990 now abandoned.

BACKGROUND OF THE INVENTION

1. Field of the Invention

The present invention is generally related to nuclear reactor fuel assemblies and in particular to thimble tubes in the fuel assembly guide tubes.

2. General Background

In commercial nuclear reactors, guide tubes provided in the fuel assembly have thimble tubes therein. These fuel assembly guide tubes and thimble tubes therein are spaced throughout the fuel assembly and are adapted to receive either control rods or neutron detectors. The neutron detectors are important to efficient reactor operation as they are inserted into the thimble tubes in the reactor and are used to provide flux maps of the core. The guide tubes and thimble tubes that receive the neutron detectors are part of the reactor coolant system pressure boundary and extend from a sealed table outside of the reactor vessel to the top of the core. Such instrumentation tubes normally extend through the bottom of the reactor vessel so as not to interfere with the reactor vessel cover and control rod drive mechanism. The thimble tubes are sealed at the end inside the guide tube to prevent loss of primary coolant through the thimble tube. In the reactor coolant system, coolant flows through flow holes in the lower core plate and flow holes in the lower part of the guide tubes into and through the guide tubes and exits at the top of the guide tubes. Due to their entry point into the reactor, these thimble tubes generally receive little or no lateral support along their length and are subject to flow induced vibration by the coolant during normal reactor operations. The vibrations tend to cause the thimble tubes to contact the fuel assembly guide tubes, which has resulted in through-wall wear or thinning of the thimble tubes and cracking of the fuel assembly guide tubes. Thinning of the thimble tube wall can lead to loss of integrity as a system pressure boundary and loss of reactor coolant and pressure. Cracking of the fuel assembly guide tube can lead to disruption of proper coolant flow and/or damage to the thimble tube. The addition of flow limiters has been unsuccessful as this has been reported to aggravate the problem. Plugging or repositioning the guide tubes is also not an ideal solution as this changes coolant flow or changes the positioning of neutron detectors in the core. Related patents which applicants are aware of include the following.

U.S. Pat. No. 4,229,256 discloses the use of a thimble tube having a corrugated section at its lower end to distribute the control rod deceleration forces over an extended distance in a "scram" situation.

U.S. Pat. No. 4,070,241 discloses the use of a removable radial shielding assembly for closing interassembly gaps in the reactor core assembly load plane. A flexible shielding assembly is provided with a loose fitting elongated insert in an axial opening that is bounded by upper and lower end walls. The insert is constructed of a material having a higher coefficient of thermal expansion than the shielding assembly and causes bowing thereof from pressure against the upper and lower end walls.

U.S. Pat. No. 4,318,776 discloses thimble tubes that extend through the wall of the pressure vessel of a boiling water reactor and are sealed from the interior of the pressure vessel to allow exchanging of detectors in the thimble tubes during reactor operation.

U.S. Pat. Nos. 3,664,924; 4,077,843; 4,295,935; 4,474,730; and 4,839,136 disclose the use of bimetallic spacer grids for nuclear fuel assemblies.

As it can be seen, the known art does not address the problem of damage to guide tubes and thimble tubes by flow induced vibration of thimble tubes.

SUMMARY OF THE INVENTION

The present invention solves the aforementioned problem in a straightforward manner. What is provided is a thimble tube constructed from materials having different coefficients of thermal expansion. This causes the thimble tube, which is straight at room temperature, to warp into a wavy or spiral shape along its length when exposed to normal reactor operating temperatures. This results in multiple or continuous support points of the thimble tube within the guide tube. The tendency of the thimble tube to respond to fluid flow is thus reduced and wear of the thimble tube and cracking of the fuel assembly guide tube is inhibited.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein.

DETAILED DESCRIPTION OF THE PREFERRED EMBODIMENT

Figure 1:
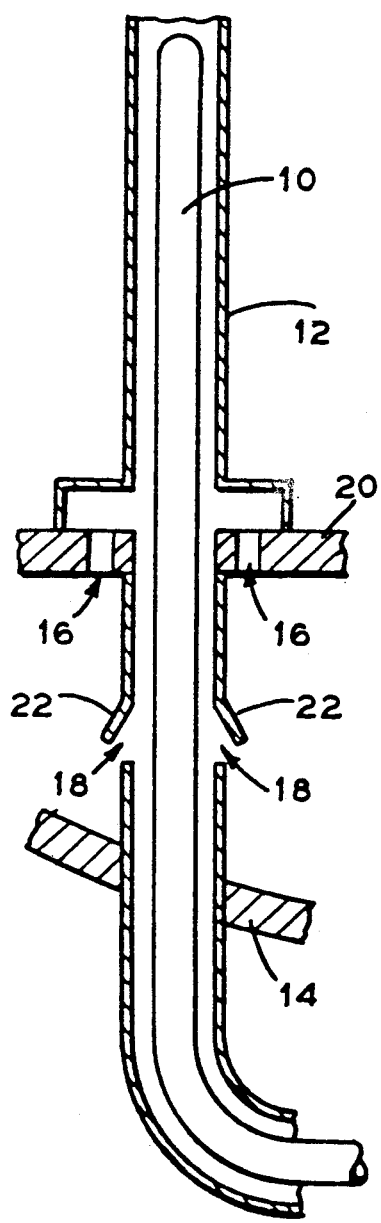
FIG. 1 illustrates a side sectional view of the prior art thimble tube in a fuel assembly guide tube.

Referring to the drawings, FIG. 1 illustrates the prior art. Thimble tube 10 is positioned inside guide tube 12 which penetrates reactor vessel wall 14 at its lower end. Guide tube 12 and reactor vessel wall 14 are sealed together in a manner known in the industry to prevent loss of coolant and pressure from the reactor. The lower end of guide tube 12 (not shown) is attached to a sealed table that allows insertion of thimble tube 10 without loss of coolant or pressure and such apparatus is known in the industry. Thimble tube 10 has no openings to allow coolant to flow thereinto and forms and is part of the reactor coolant system pressure boundary. Coolant flowing upwardly through guide tube 12 enters through flow holes 16,18 respectively provided in lower core plate 20 and the lower portion of guide tube 12. The lower portion of guide tube 12 is provided with outwardly flared edges 22 to help direct coolant into guide tube 12. A neutron detector (not shown) is inserted through the lower end of thimble tube 10 and directed to a position in thimble tube 10 to take readings of core reactivity during reactor operations. For ease of illustration, only one guide tube and thimble tube are shown and it should be understood that there are multiple guide tubes and thimble tubes in a fuel assembly adapted to receive neutron detectors. The flow of coolant through guide tube 12 in conjunction with the lack of support of thimble tube 10 results in vibration and wear of thimble tube 10.

Figure 2:
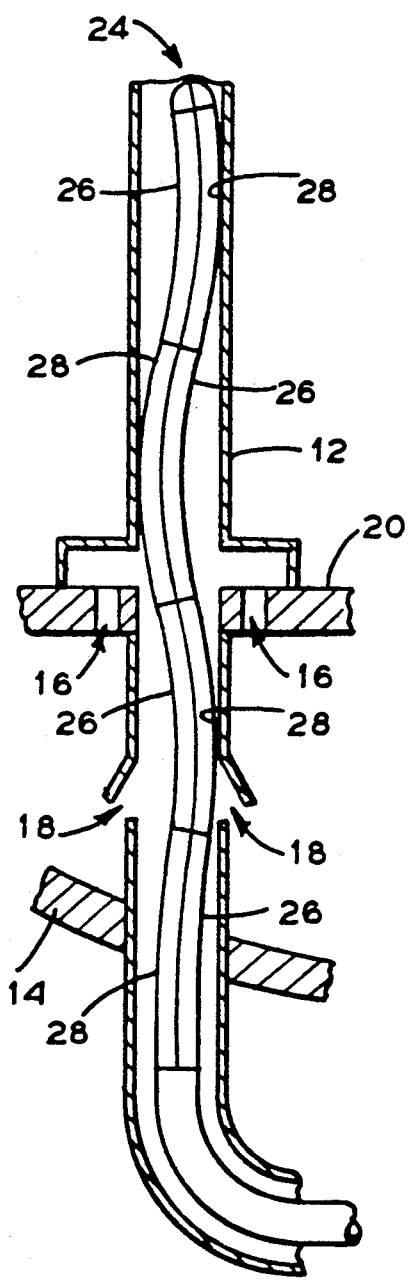
FIG. 2 illustrates a side sectional view of the thimble tube of the invention in a fuel assembly guide tube at normal operating temperature.
Figure 3:
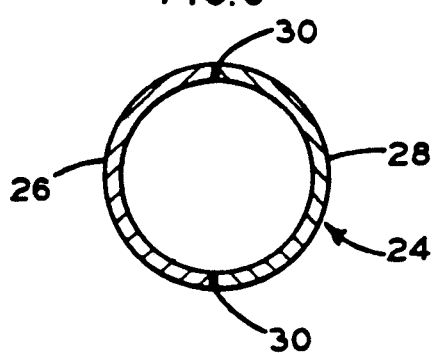
FIG. 3 is a top sectional view of a thimble tube of the invention.

Thimble tube 24 of the invention, seen in FIG. 2 and 3, is similar to thimble tube 10 in that it is an elongated hollow tube having one end closed and adapted to receive a neutron detector. The portion of thimble tube 24 that extends into the reactor, beginning slightly below reactor vessel wall 14, is formed from a bimetallic construction. As indicated by the vertical and horizontal lines in FIG. 2 the bimetallic section of thimble tube 24 is formed from a series of alternating sections 26,28 attached to each other to form thimble tube 24 in an alternating fashion along the width and length of thimble tube 24. Sections 26,28 are materials that have different coefficients of thermal expansion. As seen in the preferred embodiment and top sectional view of FIG. 3, each section 26,28 is semicircular in cross section and attached to its corresponding section having a different coefficient of thermal expansion at lines 30. At temperatures encountered during assembly or when the reactor is below normal operating temperature, the portion of thimble tube 24 in guide tube 12 is straight as in FIG. 1. This allows easy insertion and removal of thimble tube 24. At reactor operating temperatures the different coefficients of thermal expansion of sections 26,28 cause thimble tube 24 to warp into a wavy or spiral shape along its length inside guide tube 12. This provides continuous or multiple points of support to minimize coolant flow induced vibration, wear, and cracking of thimble tube 24 and guide tube 12.

Figure 4:
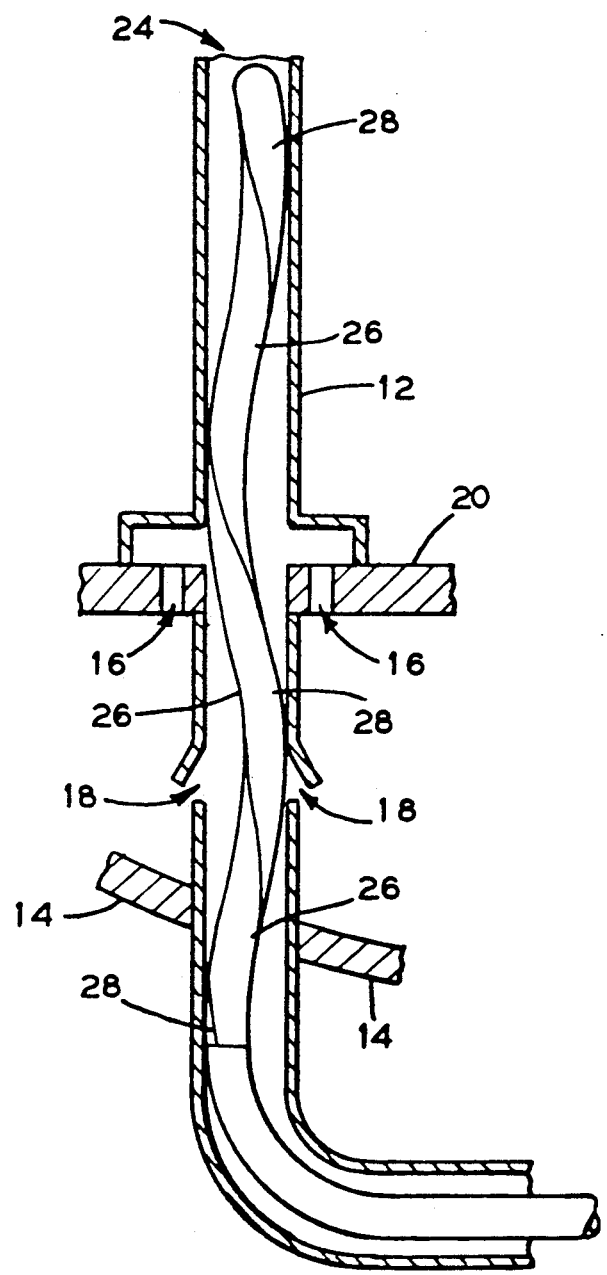
FIG. 4 illustrates a side sectional view of the spiral configuration of the thimble tube of the invention in a fuel assembly guide tube at normal operating temperature.

Sections 26,28 are formed from metals suitable for use inside a nuclear reactor and that have sufficiently different coefficients of thermal expansion and in the preferred embodiment are formed from inconel and stainless steel. The structure of thimble tube 24 is not limited to semicircular sections as illustrated. The different metals may be joined together in a spiral fashion as shown in FIG. 4. Also, a thimble tube formed from a single material may have a material having a different coefficient of thermal expansion deposited on a portion of the tube surface to achieve a similar bending effect at operating temperatures.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A thimble tube for use in a guide tube in a nuclear reactor, comprising:
   a. an elongated hollow tube having one end closed;
   b. the portion of said tube that extends into the reactor being formed from two or more sections attached to each other edge-to-edge in a spiral fashion to form said tube; and
   c. said sections being formed from materials having different thermal coefficients of expansion such that at normal reactor operating temperature said tube is caused to warp into supporting contact with the interior of the guide tube.

2. The thimble tube of claim 1, wherein said sections are respectively formed from inconel and stainless steel.

* * * * *